United States Patent
Li et al.

(10) Patent No.: US 12,513,547 B2
(45) Date of Patent: Dec. 30, 2025

(54) WIRELESS DEVICE SCHEDULING AVAILABILITY DURING NEIGHBOR CELL MEASUREMENTS

(71) Applicant: Apple Inc., Cupertino, CA (US)

(72) Inventors: Qiming Li, Beijing (CN); Yang Tang, San Jose, CA (US); Jie Cui, San Jose, CA (US); Dawei Zhang, Saratoga, CA (US); Yushu Zhang, Beijing (CN); Xiang Chen, Campbell, CA (US); Manasa Raghavan, Sunnyvale, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 991 days.

(21) Appl. No.: 17/437,788

(22) PCT Filed: Apr. 27, 2021

(86) PCT No.: PCT/CN2021/090180
§ 371 (c)(1),
(2) Date: Nov. 3, 2022

(87) PCT Pub. No.: WO2022/226767
PCT Pub. Date: Nov. 3, 2022

(65) Prior Publication Data
US 2023/0276282 A1    Aug. 31, 2023

(51) Int. Cl.
*H04W 24/10* (2009.01)
*H04L 5/00* (2006.01)
*H04W 8/22* (2009.01)

(52) U.S. Cl.
CPC .......... *H04W 24/10* (2013.01); *H04L 5/0051* (2013.01); *H04W 8/22* (2013.01)

(58) Field of Classification Search
None
See application file for complete search history.

(56) References Cited

U.S. PATENT DOCUMENTS 10,834,708 B2 * 11/2020 Si ................. H04J 11/0069
11,838,151 B1 * 12/2023 Jones ............ H04L 25/0224
(Continued)

FOREIGN PATENT DOCUMENTS

| CN | 105940632   | 9/2016 |
| CN | 109155681 A | 1/2019 |

(Continued)

OTHER PUBLICATIONS

International Search Report and Written Opinion for PCT/CN2021/090180; 11 pages; Jan. 10, 2022.
(Continued)

*Primary Examiner* — Steve R Young
(74) *Attorney, Agent, or Firm* — Kowert, Hood, Munyon, Rankin & Goetzel, P.C.

(57) ABSTRACT

This disclosure relates to techniques for aligning wireless device and cellular network expectations and behavior in conjunction with neighbor cell measurements in a wireless communication system. A wireless device may determine that a reference signal is configured for a neighbor cell measurement when communication with the serving cell is also configured. The wireless device may determine whether the reference signal for the neighbor cell measurement is configured with same or different subcarrier spacing as the communication with the serving cell. The wireless device may select one or more of the reference signal for the neighbor cell measurement or the communication with the serving cell to receive based at least in part on whether the reference signal for the neighbor cell measurement is configured with same or different subcarrier spacing as the communication with the serving cell.

20 Claims, 3 Drawing Sheets

(56) References Cited

U.S. PATENT DOCUMENTS

| | | | |
|---|---|---|---|
| 2019/0393980 A1* | 12/2019 | Lin | H04L 27/26025 |
| 2019/0394710 A1* | 12/2019 | Ugurlu | H04L 5/0098 |
| 2020/0052943 A1* | 2/2020 | Jassal | H04B 17/104 |
| 2020/0344707 A1 | 10/2020 | Nagaraja et al. | |
| 2021/0083730 A1* | 3/2021 | Hwang | H04B 7/0408 |
| 2021/0092697 A1* | 3/2021 | Harada | H04L 5/0044 |
| 2021/0297884 A1* | 9/2021 | Harada | H04B 7/0404 |
| 2022/0295530 A1* | 9/2022 | Lee | H04L 27/2602 |
| 2023/0284061 A1* | 9/2023 | Chen | H04W 24/10 370/329 |
| 2024/0107471 A1* | 3/2024 | Li | H04W 74/0833 |

FOREIGN PATENT DOCUMENTS

| | | |
|---|---|---|
| EP | 3793243 | 3/2021 |
| WO | 2017219204 A1 | 12/2017 |
| WO | 2019051467 A1 | 3/2019 |

OTHER PUBLICATIONS

"3rd Generation Partnership Project; Technical Specification Group Radio Access Network; NR; Requirements for support of radio resource management (Release 16)"; 3GPP TSG RAN WG4 Radio; 48 pages; Mar. 29, 2021.
Extended European Search Report for Patent Application No. 21878755.4; 10 pages; Sep. 20, 2022.
Office Action for CN 202180006113.0; Aug. 16, 2025.

* cited by examiner

WIRELESS DEVICE SCHEDULING AVAILABILITY DURING NEIGHBOR CELL MEASUREMENTS

PRIORITY CLAIM INFORMATION

This application is a U.S. National Stage application of International Application No. PCT/CN2021/090180, filed Apr. 27, 2021, titled "Wireless Device Scheduling Availability During Neighbor Cell Measurements", which is hereby incorporated by reference in its entirety.

FIELD

The present application relates to wireless communications, and more particularly to systems, apparatuses and methods for aligning wireless device and cellular network expectations and behavior in conjunction with neighbor cell measurements in a wireless communication system.

DESCRIPTION OF THE RELATED ART

Wireless communication systems are rapidly growing in usage. In recent years, wireless devices such as smart Phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for aligning wireless device and cellular network expectations and behavior in conjunction with neighbor cell measurements in a wireless communication system.

Setting and abiding by certain configured expectations or requirements for behavior when neighbor cell measurements are configured may allow for more efficient and predicable network and wireless device behavior, and may reduce unexpected behavior and network resource and power consumption waste, in a wireless communication system.

Accordingly, techniques are described herein for configuring and operating a wireless device in accordance with such expectations and/or requirements.

According, to the techniques described herein, a wireless device may be configured to perform a neighbor cell measurement at the same time as a communication with a serving cell of the wireless device is configured. The wireless device may select one or both of the reference signal configured for the neighbor cell measurement or the communication with the serving cell to receive based on any or all of a variety of considerations, and may receive the selected signal(s) accordingly.

The considerations may include whether the reference signal configured for neighbor cell measurement is configured with same or different subcarrier spacing as the communication with the serving cell, the capability of the wireless device with respect to simultaneously receiving reference signals for neighbor cell measurement and serving cell communications that have different subcarrier spacing, the frequency range and/or bands of the reference signal configured for neighbor cell measurement and the serving cell communication, the beam configuration(s) for the reference signal configured for neighbor cell measurement and the serving cell communication, the type of reference signal and/or the type of serving cell communication, among various possible considerations.

If only the reference signal configured for neighbor cell measurement is selected, and the received timing difference for the reference signal configured for neighbor cell measurement and the communication with the serving cell is sufficiently large, the wireless device may additionally not perform (or be expected by the serving cell to perform) communication with the serving cell for a certain amount of time (e.g., 1 symbol) before and/or after receiving the reference signal configured for neighbor cell measurement, at least in some instances.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
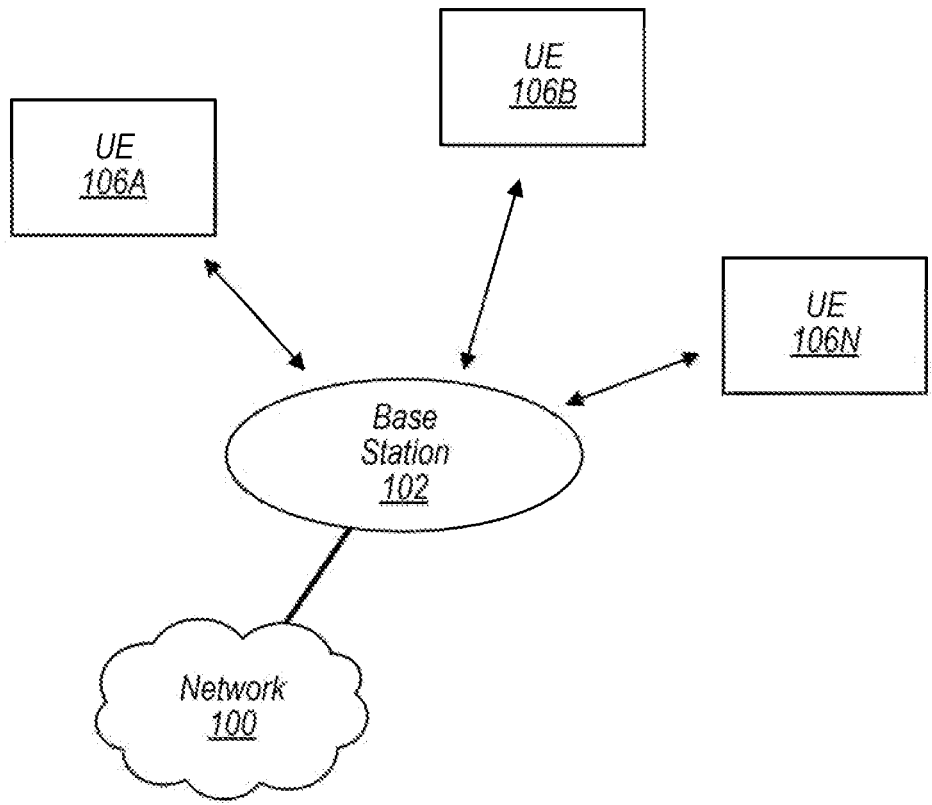
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope or the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
PDCCH: Physical Downlink Control Channel
PDSCH: Physical Downlink Shared Channel
PUCCH: Physical Uplink Control Channel
PUSCH: Physical Uplink Shared Channel
DCI: Downlink Control information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
SRS: Sounding Reference Signal
CMR: Channel Measurement Resource
IMR: Interference Measurement Resource
ZP: Zero Power
NZP: Non Zero Power
CQI: Channel Quality Indicator
PMI: Precoding Matrix indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPbone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (135)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is abroad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently, on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
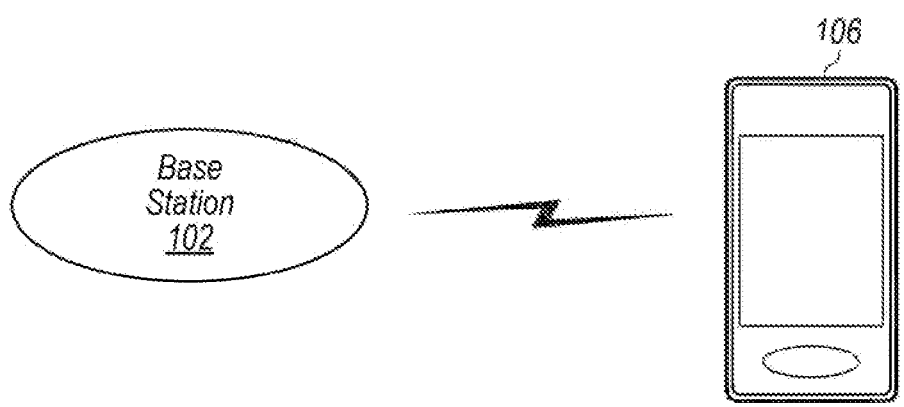
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices an/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. Far example, a UE 106 might be configured to communicate using either or both of a 3GPP cellular communication standard or a 3GPP2 cellular communication standard. In same embodiments, the UE 106 may be configured to perform neighbor cell measurements in a wireless communication system in accordance with techniques for aligning wireless device and cellular network expectations and behavior in conjunction with neighbor cell measurements, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
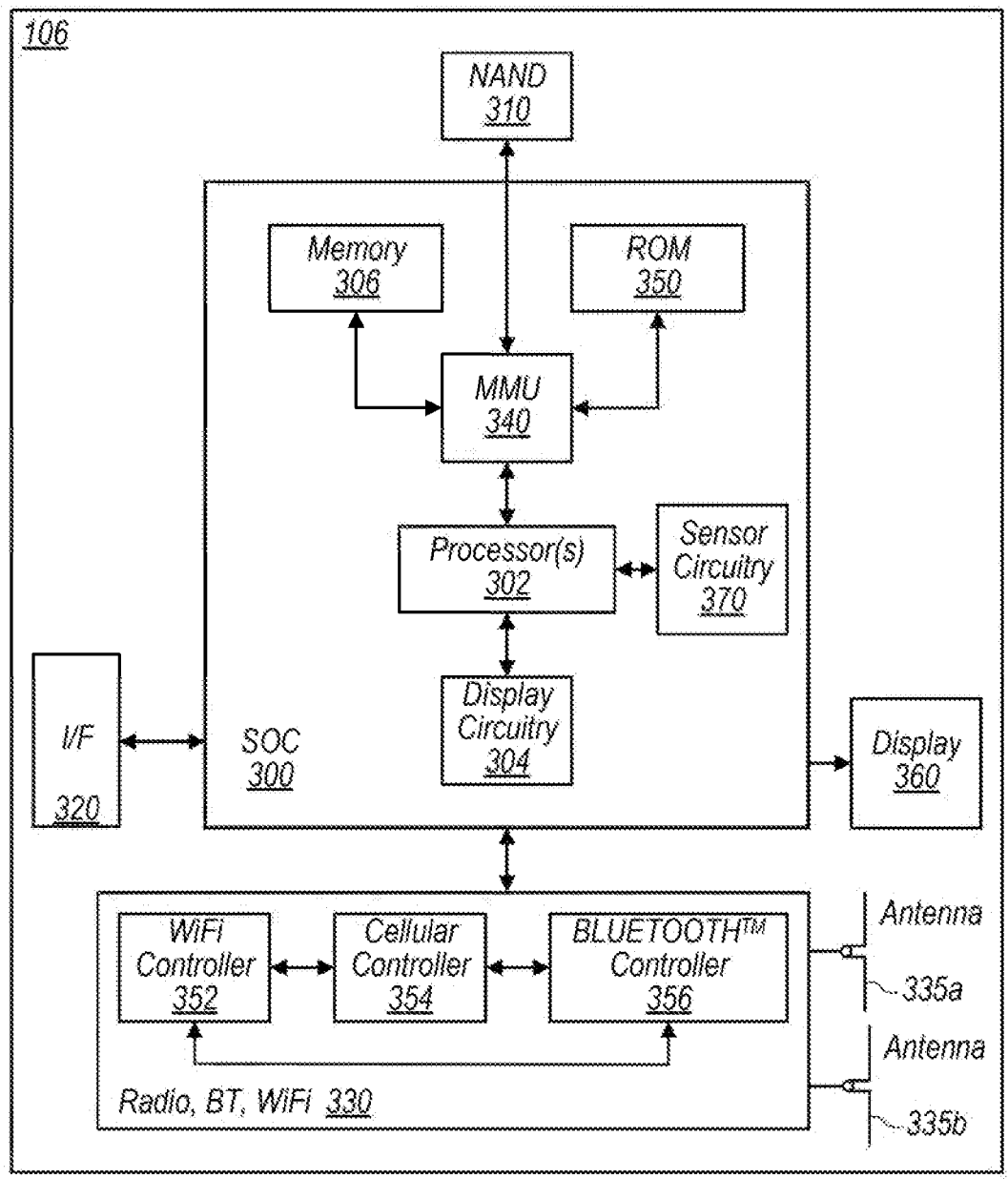
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform neighbor cell measurements in a wireless communication system in accordance with techniques for aligning wireless device and cellular network expectations and behavior in conjunction with neighbor cell measurements, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific integrated Circuit). Furthermore, processor(s) 302 may be coupled to and/or may interoperate with other components as shown in FIG. 3, to perform neighbor cell measurements in a wireless communication system in accordance with techniques for aligning wireless device and cellular network expectations and behavior in conjunction with neighbor cell measurements according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processors) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106, Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
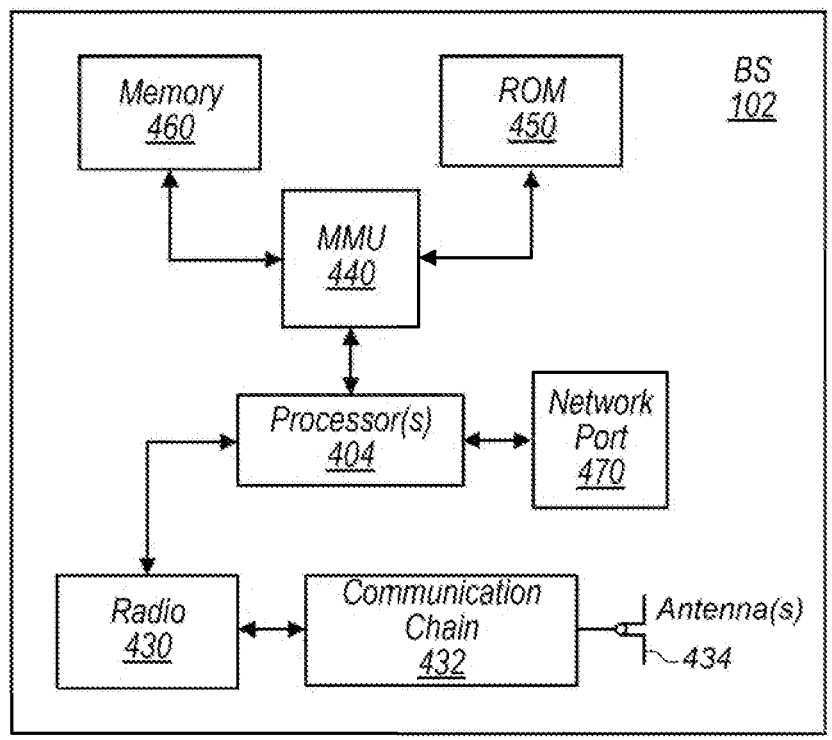
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality or devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc.

The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a preceding matrix indicator (PMI), a rank indicator (RI), a CSI-RS Resource Indicator (CRI), SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
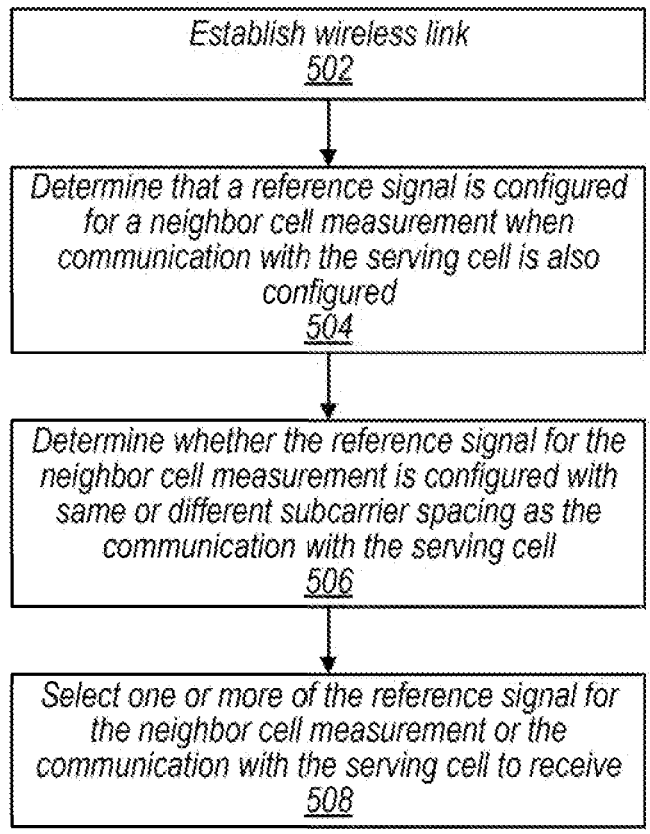
FIG. 5 is a flowchart diagram illustrating aspects of an exemplary possible method for a wireless device to operate its accordance with a framework for aligning wireless device and cellular network expectations and behavior in conjunction with neighbor cell measurements in a wireless communication system, according to some embodiments.

FIG. 5—Aligning Wireless Device and Cellular Network Expectations and Behavior in Conjunction With Neighbor Cell Measurements A wireless device in a cellular communication system my typically perform neighbor cell measurements and serving cell measurements at various times, e.g., in addition to performing data and control communications, for example in order to ensure continued good reception and facilitate cell handover and re-selection, among various other uses. There may be numerous types of signals and channels that can be used for a variety of types of measurements and communications with neighboring and serving cells. Additionally, there may be numerous types of wireless devices, which may have differing capabilities, operating in a given cellular communication system.

Given the wide range of possible wireless devices that can operate and scenarios that can occur in a given cellular communication system, it may be useful to define at least some expected or required wireless device and/or network behavior in conjunction with various scenarios, at least potentially in a manner that may reduce or avoid wasteful network power/resource usage and unexpected interference. One such area may include aligning wireless device and cellular network expectations and behavior in conjunction with neighbor cell measurements.

To illustrate one such set of possible techniques, FIG. 5 is a flowchart diagram illustrating a method for a wireless device to operate in a cellular communication system when neighbor cell measurements are configured in accordance with a framework for aligning wireless device and cellular network expectations and behavior in conjunction with neighbor cell measurements, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or oilier method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In some instances, the capability information may include information indicating whether the wireless device supports simultaneously receiving reference signals for neighbor cell measurement and communications with the serving cell that have different numerology (e.g., subcarrier spacing). For example, the capability information could indicate whether the wireless device supports concurrent CSI-RS based neighbor cell measurement and serving cell PDCCH or PDSCH reception with different subcarrier spacing. Such capability information could indicate one or more different subcarrier spacing combinations for which the wireless device supports concurrent CSI-RS based neighbor cell measurement and serving cell PDCCH or PDSCH reception with different subcarrier spacing. Additionally or alternatively, such capability information could indicate whether the wireless device supports concurrent CSI-RS based neighbor cell measurement and serving cell PDCCH car PDSCH reception with different subcarrier spacing for one or more of 3GPP layer 1 (L1) or layer 3 (L3) neighbor cell measurement. As a still further possibility, such capability information could indicate whether the wireless device supports concurrent CSI-RS based neighbor cell measurement and serving cell PDCCH or PDSCH reception with different subcarrier spacing for one or more of intra-frequency measurement or inter-frequency measurement.

It may also or alternatively be possible for the wireless device to provide capability information indicating whether the wireless device supports simultaneously receiving reference signals for neighbor cell measurement and reference signals for serving cell measurement with different numerology, for example for concurrent SSB based neighbor cell measurement and SSB based serving cell measurement with different subcarrier spacing, and/or for concurrent CSI-RS based neighbor cell measurement and CSI-RS based serving cell measurement with different subcarrier spacing. Capability information could also or alternatively be provided by the wireless device to indicate whether the wireless device supports concurrent SSB based neighbor cell measurement and serving cell PDCCH or PDSCH reception with different subcarrier spacing. Any or all such capability indications may be provided with any of various levels of granularity or specificity, for example with respect to one or more different supported or unsupported subcarrier spacing combinations, whether the support applies to 3GPP L1 and/or 3GPP L3 neighbor cell measurements, and/or whether the support applies to intra-frequency measurement and/or inter-frequency measurement, among various possibilities.

In some instances, the wireless device may additionally or alternatively provide capability information to indicate one or more L1 neighbor cell measurement support capabilities of the wireless device. For example, such capabilities could include one or more numbers of L1 measurements the wireless device is capable of performing (e.g., the maximum number of L1 measurements the wireless device is capable of performing in each of one or more scenarios or sets of conditions, such as for one port NZP CSI-RS resources and SSBs, for two port NZP CSI-RS resources, for aperiodic CSI-RS resources, etc.). Such capability information may be provided as combined capability information for both L1 neighbor and serving cell measurements, or may be provided as L1 neighbor cell measurement specific capability information, according to various embodiments.

In 504, the wireless device may determine that a reference signal is configured for a neighbor cell measurement when communication with the serving cell is also configured. The reference signal may be any of various types of reference signal, and the communication with the serving cell may include any of various types of communications.

As one possibility, the reference signal may include a reference signal configured for an L1 or L3 neighbor cell measurement. For example, the configured reference signal could include CSI-RS for L1 reference signal received power (RSRP), CSI-RS for L1 signal to interference plus noise ratio (SINR), CSI-RS for L3, SSB for L1-RSRP, SSB for L1-SINR, or SSB for L3, among various possibilities.

In some instances, the communication with the serving cell may include one or more of a control or data communication, such as a PDCCH transmission and/or a PDSCH transmission. As another possibility, the communication with the serving cell may include a reference signal configured for cell measurement and/or one or more other purposes, such as a CSI-RS or SSB. For example, the communication with the serving cell could include CSI-RS or SSB from the serving cell configured from radio link monitoring (RLM), beam failure detection (BFD), candidate beam detection (CBD), or L1-RSRP measurement, among various possibilities.

In 506, the wireless device may determine whether the reference signal for the neighbor cell measurement is configured with same or different subcarrier spacing as the communication with the serving cell. This may include determining the subcarrier spacing for each cell, and determining whether the determined subcarrier spacings are the same or are different, at least in some instances. The wireless device may determine the subcarrier spacing for each cell in any of a variety of possible ways. For example, such determination could be based on system acquisition and/or system information associated with each cell, dedicated configuration information (e.g., provided via RRC) provided to the wireless device, reference signal and/or channel type, implicit determination (e.g., based on cellular communication standard specifications, cell frequency range, cell carrier, other cell characteristics, etc.), among various possibilities. In some instances, if the reference signal for the neighbor cell measurement is configured with different subcarrier spacing than the communication with the serving cell, the wireless device may further determine the subcarrier spacing combination of the reference signal configured for the neighbor cell measurement and the communication with the serving cell. For example, if the wireless device has capability for concurrent neighbor cell measurement and serving cell communication with different numerologies for some subcarrier spacing combinations but not other subcarrier spacing combinations, the wireless device may determine if the subcarrier spacing combination of the reference signal configured for the neighbor cell measurement and the communication with the serving cell is supported by the wireless device.

In 508, the wireless device may select one or more of the reference signal for the neighbor cell measurement or the communication with the serving cell to receive. The wireless device may receive the selected signal(s) and drop (e.g., not receive/transmit) any signal(s) not selected. The selection may be performed in accordance with cellular communication standard specifications for expected or required wireless device behavior, and the cellular base station(s) serving the wireless device may accordingly expect the selection made by the wireless device, at least according to some embodiments.

The selection may be based at least in part on whether the reference signal for the neighbor cell measurement is configured with same or different subcarrier spacing as the communication with the serving cell, at least according to some embodiments. For example, in some instances, it the reference signal for the neighbor cell measurement and the communication with the serving cell are in 3GPP frequency range 1 (FR1), both the reference signal for the neighbor cell measurement and the communication with the serving cell may be selected if the reference signal for the neighbor cell measurement is configured with same subcarrier spacing as the communication with the serving cell.

In some instances, the selection may be further based at least in part on the wireless device capability for supporting simultaneous reception with different numerologies. For example, it may be the case that in FR1 the wireless device selects both the reference signal for the neighbor cell measurement and the communication with the serving cell to receive if the reference signal for the neighbor cell measurement is configured with different subcarrier spacing as the communication with the serving cell and the wireless device supports simultaneously receiving reference signals for neighbor cell measurement and communications with the serving cell that have different subcarrier spacing (e.g., including for the specific subcarrier spacing combination, type of reference signal configured for neighbor cell measurement, and type of communication with the serving cell). If the wireless device does not support simultaneously receiving reference signals for neighbor cell measurement and communications with the serving cell that have different subcarrier spacing (e.g., at least for the specific subcarrier spacing combination, type of reference signal configured for neighbor cell measurement, and/or type of communication with the serving cell), however, it may be the case that the wireless device selects only one of the reference signal for the neighbor cell measurement or the communication with the serving cell to receive. Which is selected may depend at least in part on the type and/or characteristics of the reference signal configured for the neighbor cell measurement and the communication with the serving cell. For example, in some instances, the neighbor cell measurement may be prioritized over some or all data and control communications (e.g., PUSCH, PUCCH, PDCCH, and PDSCH transmissions). It may also be possible that certain scenarios (e.g., exceptions) in which the serving cell communication is prioritized over the neighbor cell measurement can be configured, such as for the SSB and CORESET for remaining minimum system information (RMSI) scheduling multiplexing patterns 2 and 3, in some instances. For at least some scenarios in which the communication with the serving cell includes a reference signal configured for serving cell measurement, it may be the case that the wireless device can select either (e.g., at equal priority) of the neighbor cell measurement or the serving cell measurement (e.g., for SSB or CSI-RS for RLM, BFD, CBD, or L1-RSRP, as some possibilities).

Note that if the wireless device select only the reference signal for the neighbor cell measurement to receive during one or more orthogonal frequency division multiplexing (OFDM) symbols, in addition to dropping the communication with the serving cell during those OFDM symbols, if the received timing difference between the reference signal for the neighbor cell measurement and the communication with the serving cell is greater than a certain threshold (e.g., the length of the cyclic prefix of the active bandwidth part), the wireless device may drop communication with the serving cell for at least one OFDM symbol before and/or after those OFDM symbols. Dropping such symbols may help support the wireless ability to switch the communication chain(s) of the wireless device between the different subcarrier spacings and/or with respect to other communication chain configuration settings.

In some instances (e.g., if the reference signal for the neighbor cell measurement and the communication with the serving cell are in 3GPP frequency range 2 (FR2), as one possibility), the wireless device may determine whether the reference signal for the neighbor cell measurement is configured with same or different beam configuration as the communication with the serving cell, and may select one or more of the reference signal for the neighbor cell measurement or the communication with the serving cell to receive based at least in part on whether the reference signal for the neighbor cell measurement is configured with same or different beam configuration as the communication with the serving cell. For example, in some instances (e.g., in FR2 if the serving cell and the neighbor cell are in the same band, as one possibility), it may be possible that the wireless device is not capable of simultaneously receiving the reference signal for the neighbor cell measurement and the communication with the serving cell even with the same numerology if different beams are configured for the reference signal for the neighbor cell measurement and the communication with the serving cell (e.g., if they are not quasi-co-located (QCL). In some embodiments, the network may provide signaling information to indicate QCL information for SSB/CSI-RS of the neighbor cell with respect to the serving cell, if applicable, which may be used by the wireless device for the determination of whether the reference signal for the neighbor cell measurement is configured with same or different beam configuration as the communication with the serving cell. In FR2, if the reference signal for the neighbor cell measurement is configured with a different beam configuration as the communication with the serving cell, or the wireless device is unable to determine whether the neighbor cell measurement is configured with the same or a different beam configuration as the communication with the serving cell, it may be the case that the wireless device selects only one of the reference signal for the neighbor cell measurement or the communication with the serving cell to receive.

Note further that the selection of one or more of the reference signal for the neighbor cell measurement or the communication with the serving cell to receive may be based at least in part on whether the reference signal for the neighbor cell measurement is configured in the same or a different band as the communication with the serving cell, at least in some instances. For example, for inter-band carrier aggregation in FR1, and/or for inter-band carrier aggregation in FR2 when the wireless device is capable of independent beam management (IBM), any intra-band scheduling restrictions may not be applicable. Thus, even if the wireless device selects only one of the reference signal for the neighbor cell measurement or the communication with the serving cell to receive in one band, the wireless device may also be able to concurrently receive communication(s) on serving cells in other bands (e.g., in which no reference signals for neighbor cell measurements are configured), e.g., provided the wireless device is otherwise capable of performing concurrent reception on multiple bands.

Thus, at least according to some embodiments, the method of FIG. 5 may be used to align expectations between a wireless device and a cellular base station with respect to which signals the wireless device receives when neighbor cell measurements are configured at the same time as serving cell communications, in a manner that may help support reduced wireless device complexity and power consumption, and/or reduced network power and/or resource waste, at least in some instances.

Additional Information

The following additional information describes further aspects that might be used in conjunction with the method of FIG. 5 if desired. It should be noted, however, that the exemplary details described are not intended to be limiting to the disclosure as a whole: numerous variations and alternatives to the details provided herein below are possible and should be considered within the scope of the disclosure.

In 3GPP Releases 15 and 16, L1 measurements on serving cells, including L1-RSRP and L1-SINR measurements, may be supported. Corresponding UE L1 measurement capability and measurement restriction may currently be specified in 3GPP TS 38.306 v.16.4.0 and 38.133 v.16.7.0, respectively. For example, UE scheduling availability in conjunction with such measurements (e.g., including whether/when a UE can be scheduled for data communications before, during, and after L1 measurements on a serving cell are performed) may currently be specified in 3GPP TS 38.133 v.16.7.0.

L1 measurements on neighbor cells are not supported in 3GPP Releases 15 and 16, but may be supported in 3GPP Release 17. Accordingly, it may be useful to provide a framework for determining UE scheduling availability in conjunction with such L1 measurements on neighbor cells, e.g., to avoid unnecessary network power and/or resource usage, to avoid unexpected interference, and/or for any of various other possible reasons.

One possible aspect of such a framework could include introducing a new UE capability indication relating to whether a UE supports simultaneous serving cell PDCCH/PDSCH reception and neighbor cell CSI-RS measurement with different subcarrier spacing. Such capability information could be designed in any of a variety of ways, e.g., to include more or less information at any of various levels of granularity.

For example, as one option, to single bit capability indicator (e.g., "simultaneousRxDataCSI-RS-DiffNumerology") could be defined, and may be used to indicate whether a UE supports concurrent CSI-RS based measurement on a neighboring cell and PDCCH or PDSCH reception from the serving cell with a different numerology.

As another option, the capability indicator could be split into two bits (e.g., "simultaneousRxDataL1CSI-RS-numerology" and "simultaneousRxDataL1CSI-RS-numerology"), to respectively indicate whether the UE supports concurrent CSI-RS based L1 and L3 measurement on a neighboring cell and PDCCH or PDSCH reception from the serving cell with a different numerology.

As a further option, two single bit capability indicators (e.g., "simultaneousRxDataCSI-RS-DiffNumerology-intra" and "simultaneousRxDataCSI-RS-DiffNumerology-inter") could be defined, which can be used for UE capability reporting to support concurrent CSI-RS based measurement on a neighboring cell and PDCCH or PDSCH reception from the serving cell with a different numerology for intra-frequency and inter-frequency measurement respectively. Note that in such a scenario, a UE that indicates support of inter-frequency measurement with different numerologies may be reporting support for CSI-RS based inter-frequency measurement without a measurement gap.

As a still further option, each such capability indicator could be split into two bits, e.g., to differentiate the support of concurrent CSI-RS based L1 and L3 measurement on a neighboring cell and PDCCH or PDSCH reception from the serving cell with a different numerology for each of intra-frequency and inter-frequency measurement.

In some instances, any of the previously described options for reporting UE capability for supporting concurrent CSI-RS based measurement on a neighboring cell and PDCCH or PDSCH reception from the serving cell with a different numerology can be further split into multiple bits to indicate support for different combinations of numerologies. For example, a range of supported combinations of numerologies could be indicated by a UE when reporting such capability information, such as any or all of {15 kHz-30 kHz; 15 kHz-60 kHz; 15 kHz-120 kHz; 30 kHz-60 kHz; 30 kHz-120 kHz; 60 kHz-120 kHz}, among various other possibilities.

Note that, at least in some instances, neighbor L1 measurements described herein may include an or all of neighbor SSB and/or CSI-RS base. L1-RSRP and/or L1-SINR measurements.

Regardless of whether or how UE capability reporting for supporting concurrent. CSI-RS based measurement on a neighboring cell and PDCCH or PDSCH reception from the serving cell with a different numerology is configured, it may be useful to provide a framework according to which it may be possible to determine the scheduling availability of a UE during neighbor cell L1 measurements, at least according to some embodiments.

According to one such possible framework, in 3GPP frequency range 1 (FR1), it may be the case that if reference signals (e.g., SSB or CSI-RS) from a neighbor cell configured for L1 measurement have the same SCS as PDCCH/PDSCH in the active bandwidth part of the serving cell, there are no scheduling restrictions due to the neighbor cell L1 measurement. Thus, it may be possible for the serving cell to schedule the UE for PDCCH/PDSCH reception concurrently with the configured neighbor cell L1 measurement in such a scenario.

If there is a SSB from a neighbor cell configured for L1 measurement that has different SCS than the PDCCH/PDSCH in the active BWP of the serving cell in FR1, it may be the case that there are no scheduling restrictions due to the neighbor cell L1 measurement using SSB was RS for UEs that support (e.g., including reporting as a UE capability) simultaneousRxDataSSB-DiffNumerology.

For L1 UEs that do not support simultaneousRxDataSSB-DiffNumerology, the serving cell and the UEs may apply certain restrictions and/or assumptions to UE scheduling availability due to L1 measurements based on neighbor cell SSBs configured for L1 measurement. For example, such a UE may not be expected to transmit PUCCH/PUSCH/SRS or receive PDCCH/PDSCH/CSI-RS for tracking/CSI-RS for CQI on symbols corresponding to the neighbor cell SSB indexes configured for L1 measurement. If the received timing difference (RTD) between the neighbor cell SSB configured for L1 measurement and the serving cell PDCCH/PDSCH/CSI-RS exceeds the cyclic prefix (CP) length of the active BWP, it may be the case that the UE is not expected to transmit PUCCH/PUSCH/SRS or receive PDCCH/PDSCH/CSI-RS for tracking CSI-RS for CQI on 1 data symbol before each consecutive SSB symbol to be measured and 1 data symbol after each consecutive SSB symbol to be measured.

Note that when intra-band carrier aggregation in FR1 is configured, any scheduling restrictions on the serving cell based on SSB based neighbor L1 measurements may applied to all serving cells in the same band on the symbols that fully or partially overlap with restricted symbols. When inter-band carrier aggregation within FR1 is configured, it may be the case that no scheduling resinous on FR1 serving cell(s) configured in other bands than the band(s) in which the serving cell scheduling availability is restricted due to neighbor L1 measurements.

If there is a CSI-RS from a neighbor cell configured for L1 measurement that has different SCS than the PDCCH/PDSCH in the active BWP of the serving cell in FR1, it may be the case that the UE is not expected to transmit PUCCH/PUSCH/SRS or receive PDCCH/PDSCH/CSI-RS for tracking/CSI-RS for CQI on symbols corresponding to the neighbor cell CSI-RS indexes configured for L1 measurement. Additionally, in some instances, if the RTD between the neighbor cell CSI-RS configured for L1 measurement and the serving cell PDCCH/PDSCH/CSI-RS exceeds the CP length of the active BWP, it may be the case that the UE is not expected to transmit PUCCH/PUSCH/SRS or receive PDCCH/PDSCH/CSI-RS for tracking/CSI-RS for CQI on 1 data symbol before each consecutive CSI-RS symbol to be measured and 1 data symbol after each consecutive CSI-RS symbol to be measured. Such an approach could be used if no simultaneousRxDataCSI-RS-DiffNumerology capability is defined, as one possibility.

As another possibility, it may be the case that there are no scheduling restrictions due to the neighbor cell L1 measurement using CSI-RS as RS for UEs that support (e.g., including reporting as a UE capability) simultaneousRxDataCSI-RS-DiffNumerology. In some instances, the lack of scheduling restrictions in such a scenario may depend on the specific simultaneousRxDataCSI-RS-DiffNumerology reporting of the UE being applicable to the scenario at hand, e.g., in view of the specific different SCS combination for the neighbor cell L1 measurement and the serving cell PDCCH/PDSCH, for example in case more finely grained capability reporting is configured with respect to support for different SCS combinations.

For UEs that do not support simultaneousRxDataCSI-RS-DiffNumerology, the serving cell and the UEs may apply certain restrictions and/or assumptions to UE scheduling availability due to L1 measurements based on neighbor cell CSI-RS configured for L1 measurement. For example, such a UE may not be expected to transmit PUCCH/PUSCH/SRS or receive PDCCH/PDSCH/CSI-RS for tracking/CSI-RS for CQI on symbols corresponding to the neighbor cell CSI-RS configured for L1 measurement. If the RTD between the neighbor cell CSI-RS configured for L1 measurement and the serving cell PDCCH/PDSCH/CSI-RS exceeds the CP length of the active BWP, it may be the case that the UE is not expected to transmit PUCCH/PUSCH/SRS or receive PDCCH/PDSCH/CSI-RS for tracking/CSI-RS for CQI on 1 data symbol before each consecutive CSI-RS symbol to be measured and 1 data symbol after each consecutive CSI-RS symbol to be measured.

Note that when intra-band carrier aggregation in FR1 is configured, any scheduling restrictions on the serving cell based on CSI-RS based neighbor L1 measurements may applied to all serving cells in the same band on the symbols that fully or partially overlap with restricted symbols. When inter-band carrier aggregation within FR1 is configured, it may be the case that no scheduling restrains on FR1 serving cell(s) configured in other bands than the band(s) in which the serving cell scheduling availability is restricted due to neighbor L1 measurements.

According to some embodiments, a different framework for determining UE scheduling availability during neighbor cell L1 measurements may be used for 3GPP frequency range 2 (FR2) than for FR1, for example due to potentially increased need/use for beamforming in FR2 in comparison to FR1. For example, according to one possible framework, it may be the case that a UE is not expected to transmit PUCCH/PUSCH/SRS or receive PDCCH/PDSCH/CSI-RS for tracking/CSI-RS for CQI on one or more of: symbols corresponding to SSB indexes configured for neighbor cell L1 measurements; symbols corresponding to periodic CSI-RS resources configured for neighbor cell L1 measurements; symbols corresponding to semi-persistent CSI-RS resources configured for neighbor cell L1 measurements when such resources are activated; or symbols corresponding to aperiodic CSI-RS resources configured for neighbor cell L1 measurements when the reporting is triggered. If the RTD between the neighbor cell SSB or CSI-RS resources configured for L1 measurement and the serving cell PDCCH/PDSCH/CSI-RS exceeds the CP length of the active BWP, it may be the case that the UE is not expected to transmit PUCCH/PUSCH/SRS or receive PDCCH/PDSCH/CSI-RS for tracking/CSI-RS for CQI on 1 data symbol before each consecutive SSB or CSI-RS symbol to be measured and 1 data symbol after each consecutive SSB or CSI-RS symbol to be measured.

As another possibility, in some instances, it may be possible to introduce new signaling to allow the network to indicate the QCL information from the SSB/CSI-RS of the neighbor cell to that of the serving cell (e.g., the neighbor cell SSB TRS may be the same as for the serving cell SSB). In such a scenario, if the RS for L1 measurement from the neighbor cell is QCL with the active TCI state for the serving cell PDCCH/PDSCH and not in a CSI-RS resource set with repetition ON, and no receive beam sweeping is needed for the measurement (e.g., N=1 applies as specified in 3GPP TS 38.133 v.16.7.0 section 9.5.42), it may be the case that there are no scheduling restrictions due to the L1 measurement performed based on the RS from the neighbor cell.

When intra-band carrier aggregation in FR2 is performed, it may be the case that the scheduling restrictions UR the serving cell where the neighbor cell L1 measurement is performed apply to all serving cells in the same band on the symbols that fully or partially overlap with the restricted symbols.

When inter-band carrier aggregation in FR2 is performed, it may be the case that there are no scheduling restrictions on FR2 serving cells in different bands than FR2 serving cells with scheduling restrictions due to neighbor cell L1 measurements, provided that the UE is capable of independent beam management (IBM) on this FR2 band pair. Additionally, it may be the case that there is no scheduling restriction if the UE is configured with different numerology between SSB or CSI-RS on one FR2 band and data on the other FR2 band, provided the UE is configured with IBM operation for the band pair.

Note there may be some exceptions to scheduling restrictions on a serving cell due to neighbor L1 measurements in such a framework. For example, as one such possibility, if a UE has been notified of a system information update (e.g., through paging information), and the gap between the UE's reception of PDCCH that the UE monitors in the Type 2 PDCCH CSS set and that includes the notification of the system information update and the PDCCH that the UE monitors in the Type 0 PDCCH CSS set is greater than 2 slots, for the SSB and CORESET for RMSI scheduling multiplexing patterns 3, the UE may be expected to receive the PDCCH that the UE monitors in the Type 0 PDCCH CSS set, and the corresponding PDSCH, an SSB symbols to be measured for L1 measurement. In such a scenario, for the SSB and CORESET for RMSI scheduling multiplexing patterns 2, the UE may also or alternatively be expected to receive the PDSCH that corresponds to the PDCCH that the UE monitors in the Type 0 PDCCH CSS set SSB symbols to be measured for L1 measurement.

Note also that a similar framework may be used for configuring scheduling restrictions in conjunction with neighbor cell L3 measurements with different SCS, if desired. For example, as previously noted herein, UE capability information for indicating whether simultaneous serving cell control/data communications and neighbor cell CSI-RS L3 measurements with different SCS are supported may be supported, at least in some instances. Such information may be used by the UE and the network according to a similar framework as previously described herein for determining if a UE is expected to receive both serving cell control/data communications and neighbor cell CSI-RS L3 measurements with different SCS when both are concurrently scheduled, or if the UE is not expected to receive one or more such communications in such a scenario.

In addition to aligning scheduling availability expectations for a UE when neighbor cell L1 measurements are configured, or alternatively, it may be useful to provide a framework for aligning expectations for UE behavior when serving cell measurements and neighbor cell L1 measurements are configured, at least according to some embodiments.

At least according to some embodiments, the existing UE capability regarding support of maximum number of L1 measurements is specified in 3GPP TS 38.306 v 16.4.0, in a beamManagementSSB-CSI-RS information element (IE). Currently, this beamManagementSSB-CSI-RS may be defined specifically for serving cells. Accordingly, it may be useful to provide a new was of reporting UE capability for indicating the support of maximum number of L1 measurements on neighbor cells, for example such that if the actual number of configured resources exceeds the indicated UE capability, the UE is allowed to not meet the corresponding measurement requirements and the UE behavior may be not defined.

As one possibility for providing a mechanism for such UE capability reporting, a new UE capability IE may be defined that may be used to indicate the maximum number of supported L1 measurements on neighbor cells by a UE. The following example could be used as one possible design for such a "neighborCellBeamManagementSSB-CSI-RS" IE, at least according to some embodiments.

neighborCellBeamManagementSSB-CSI-RS

Defines support of SS/PBCH and CSI-RS based RSRP measurements on neighbor cells. The capability comprises signalling of maxNumberSSB-CSI-RS-ResourceOneTx indicates maximum total number of configured one port NZP CSI-RS resources and SS/PBCH blocks that are supported by the UE to measure L1-RSRP as specified in TS 38.215 [13] within a slot and across all neighbor cells (see NOTE).

maxNumberCSI-RS-Resource indicates maximum total number of configured NZP-CSI-RS resources that are supported by the UE to measure L1-RSRP as specified in TS 38.215 [13] across all neighbor cells (see NOTE).

maxNumberCSI-RS-ResourceTwoTx indicates maximum total number of two ports NZP CSI-RS resources that are supported by the UE to measure L1-RSRP as specified in TS 38.215 [13] within a slot and across all neighbor cells (see NOTE).

supportedCSI-RS-Density indicates density of one RE per PRB for one port NZP CSI-RS resource for RSRP reporting, if supported.

maxNumberAperiodicCSI-RS-Resource indicates maximum number of configured aperiodic CSI-RS resources across all neighbor cells (see NOTE).

NOTE: If the UE sets a value other than n0 in an FR1 band, it shall set that same value in all FR1 bands. If the UE sets a value other than n0 in an FR2 band, it shall set that same value in all FR2 bands. The UE supports a total number of resources equal to the maximum of the FR1 and FR2 value, but no more than the FR1 value across all FR1 serving cells and no more than the FR2 value across all FR2 serving cells.

Note that it may be possible for only a subset of the described example components of such an IF to be included, and/or for other components to be included in such an IE, among various possibilities. Note also that such UE capability can be defined per band, if desired.

As another possibility, the current beamManagementSSB-CSI-RS UE capability IE may be redefined to cover both serving and neighbor cells. The following example could be used as one possible design for such a "beamManagementSSB-CSI-RS-r17" IE, at least according to some embodiments.

beamManagementSSB-CSI-RS

Defines support of SS/PBCH and CSI-RS based RSRP measurements. The capability comprises signalling of maxNumberSSB-CSI-RS-ResourceOneTx indicates maximum total number of configured one port NZP CSI-RS resources and SS/PBCH blocks that are supported by the UE to measure L1-RSRP as specified in TS 38.215 [13] within a slot and across all serving and neighbor cells (see NOTE). On FR2, it is mandatory to report>=8; On FR1, it is mandatory with capability signalling to report>=8.

maxNumberCSI-RS-Resource indicates maximum total number of configured NZP-CSI-RS resources that are supported by the UE to measure L1-RSRP as specified in TS 38.215 [13] across all serving and neighbor cells (see NOTE). It is mandated to report at least n8 for FR1.

maxNumberCSI-RS-ResourceTwoTx indicates maximum total number of two ports NZP CSI-RS resources that are supported by the UE to measure L1-RSRP as specified in TS 38.215 [13] within a slot and across all serving and neighbor cells (see NOTE).

supportedCSI-RS-Density indicates density of one RE per PRB for one port NZP CSI-RS resource for RSRP reporting, if supported. On FR2, it is mandatory to report either "three" or "oneAndThree"; on FR1, it is mandatory with capability signalling to report either "three" or "oneAndThree".

maxNumberAperiodicCSI-RS-Resource indicates maximum number of configured aperiodic CSI-RS resources across all serving and neighbor cells (see NOTE). For FR1 and FR2, the UE is mandated to report at least n4.

NOTE: If the UE sets a value other than n0 in an FR1 band, it shall set that same value in all FR1 bands. If the UE sets a value other than n0 in an FR2 and, it shall set that same value in all FR2 bands. The UE supports a total number of resources equal to the maximum of the FR1 and FR2 value, but no more than the FR1 value across all FR1 serving cells and no more than the FR2 value across all FR2 serving cells.

Note that it may be possible for only a subset of the described example components of such an IE to be included, and/or for other components to be included in such an IE, among various possibilities. Note also that such UE capability can be defined per band, if desired. In various embodiments, different minimum UE capability reporting values may be mandated for one or more such IE components than in the provided example.

For FR1, when the SSB from a neighbor cell configured for L1-RSRP measurement is in the same OFDM symbol as CSI-RS from the serving cell for radio link Monitoring (RLM), beam failure detection (BFD), candidate beam detection (CBD), or L1-RSRP measurement, if the SSB and CSI-RS have the same SCS, it may be the case that a UE is able to measure the SSB for L1-RSRP measurement without any restriction, at least according to some embodiments. If the SSB and CSI-RS have different SCS, if the UE supports simultaneousRxDataSSB-DiffNumerology, it may be the case that the UE is able to measure the SSB for L1-RSRP measurement without any restriction. If the UE does not support simultaneousRxDataSSB-DiffNumerology, it may be the case that the UE is required or expected to measure one of but not both of the SSB for L1-RSRP measurement and the CSI-RS. A longer measurement period for SSB based L1-RSRP measurement may be expected and no requirements may be defined, at least in some instances.

For FR1, when the SSB from a neighbor cell configured for L1-RSRP measurement is in the same OFDM symbol as SSB from the serving cell for RLM, BFD, CBD, or L1-RSRP measurement, if the SSB from the neighbor cell and the SSB from the serving cell have the same SCS, it may be the case that a UE is able to measure the SSB from both the serving cell and the neighbor cell without any restriction, at least according to some embodiments. If the SSB from the neighbor cell and the SSB from the serving cell have different SCS, there may be several possible options. As one possibility, if a gap is provided for neighbor cell SSB based L1 RSRP measurement, the UE may be expected to measure the neighbor cell SSB in the measurement gap. As another option, the UE may be expected of required to measure only one of but not both SSB, with a longer measurement period expected. As a further option, a new UE capability may be introduced to indicate support for simultaneous measurement on SSB with different SCS, e.g., such that a UE with such capability may be able to measure the SSB from both the serving cell and the neighbor cell without any restriction, at least according to some embodiments. As a still further option, it may be the case that such a configuration with SSB from a neighbor cell and SSB from the serving cell with different SCS is discouraged and no UE measurement requirements are defined for such a scenario.

For FR2, when the SSB from a neighbor cell for L1-RSRP measurement on one component carrier (CC) is in the same OFDM symbol as CSI-RS or SSB from the serving cell for RLM, BFD, CBD, or L1-RSRP measurement on the same CC or different CCs in the same band, it may be the case that the UE is expected or required to measure one of but not both of the SSB for L1-RSRP measurement and CSI-RS. A longer measurement period for SSB based L1-RSRP measurement may be expected, and no requirements may be defined, at least in some instances. For a UE that is capable of IBM on a FR2 band pair, it may be the case that there is no measurement restriction configured when the network configures mixed numerology between SSB from a neighbor cell for L1-RSRP measurement on one FR2 band and CSI-RS or SSB from the serving cell for RLM, BFD, CBD, L1-RSRP, or L1-SINR measurement on the other FR2 band.

For FR1, when the SSB from a serving cell configured for RLM, BFD, CBD, or L1-RSRP measurement is within the active BWP and has the same SCS as a CSI-RS from a neighbor cell configured for L1-RSRP measurement in the same OFDM symbol, it may be the case that a UE is able to perform the CSI-RS measurement without any restriction, at least according to some embodiments. If the SSB from the serving cell and the CSI-RS from the neighbor cell have different SCS in such a scenario, if the UE supports simultaneousRxDataSSB-DiffNumerology, it may be the case that the UE is able to perform the CSI-RS measurement without any restriction. If the UE does not support simultaneousRxDataSSB-DiffNumerology, it may be the case that the UE is required or expected to measure one of but not both of the CSI-RS for L1-RSRP measurement and the SSB, A longer measurement period for CSI-RS based L1-RSRP measurement may be expected, and no requirements may be defined, at least in some instances.

For FR1, when the CSI-RS from a neighbor cell configured for L1-RSRP measurement is in the same OFDM symbol as another CSI-RS from the serving cell for RLM, BFD, CBD, or L1-RSRP measurement, if the two CSI-RS have the same SCS, it may be the case that a UE is able to perform both CSI-RS measurements without any restriction, at least according to some embodiments. If the CSI-RS from the neighbor cell and the CSI-RS from the serving cell have different SCS, there may be several possible options. As one possibility, if a gap is provided for neighbor cell CSI-RS based L1 RSRP measurement, the UE may be expected to measure the neighbor cell CSI-RS in the measurement gap. As another option, the UE may be expected or required to measure only one of but not both CSI-RS, with a longer measurement period expected. As a further option, a new UE capability may be introduced to indicate support for simultaneous measurement on CSI-RS with different SCS, e.g., such that a UE with such capability may be able to measure the CSI-RS from both the serving cell and the neighbor cell without any restriction, at least according to some embodiments. As a still further option, it may be the case that such a configuration with CSI-RS from a neighbor cell and CS-RS from the serving cell with different SCS is discouraged and no UE measurement requirements are defined for such a scenario.

For FR2, when the CSI-RS from a neighbor cell for L1-RSRP measurement on one CC is in the same OFDM symbol as SSB from the serving cell for RLM, BFD, or L1-RSRP measurement on the same CC or different CCs in the same band, or in the same symbol as SSB from the serving cell for CBD measurement on the same CC or different CCs in the same band when beam failure is detected, it may be the case that the UE is expected or required to measure one of but not both of the CSI-RS for L1-RSRP measurement and SSB. A longer measurement period for CSI-RS based L1-RSRP measurement may be expected, and no requirements may be defined, at least in some instances. When the CSI-RS from a neighbor cell for L1-RSRP measurement on one CC is in the same OFDM symbol as another CSI-RS from a serving cell for RLM, BFD, CBD, or L1-RSRP measurement on the same CC or different CCs in the same band, at least in several scenarios, it may be the case that the UE is required or expected to measure one of but not both CSI-RS for L1-RSRP measurement and the other CSI-RS. A longer measurement period for CSI-RS based L1-RSRP measurement may be expected in such scenarios, and no requirements may be defined, at least in some instances. Such scenarios may include if the CSI-RS from the neighbor cell for L1-RSRP measurement or the other CSI-RS from the serving cell is in a resource set configured with repetition ON, if the CSI-RS from the serving cell is configured in q1 and beam failure is detected, or if the two CSI-RS resources are not QCL-ed with respect to QCL-TypeD, or the QCL information is not known to the UE. Other exceptional scenarios may additionally or alternatively be specified, if desired. If no configured exceptional scenarios are occurring, the UE may be required or expected to be able to measure the CSI-RS from the neighbor cell for L1-RSRP measurement without any restriction, at least according to some embodiments.

For FR1, when the SSB from a neighbor cell configured as channel measurement resource (CMR) for L1-SINR measurement is in the same OFDM symbol as CSI-RS from the serving cell for RLM, RFD, CBD, or L1-RSRP measurement, if the SSB and CSI-RS have the same SCS, it may be the case that a UE is able to measure the SSB for L1-SINR measurement without any restriction, at least according to some embodiments. If the SSB and CSI-RS have different SCS, if the UE supports simultaneousRxDataSSB-DiffNumerology, it may be the case that the UE is able to measure the SSB for L1-SINR measurement without any restriction. If the UE does not support simultaneousRx-DataSSB-DiffNumerology, it may be the case that the UE is required or expected to measure one of but not both of the SSB for L1-SINR measurement and the CSI-RS. A longer measurement period for SSB based L1-SINR measurement may be expected, and no requirements may be defined, at least in some instances.

For FR1, when the SSB from a neighbor cell configured for L1-SINR measurement is in the same OFDM symbol as SSB from the serving cell for RLM, RFD, CBD, or L1-RSRP measurement, if the SSB from the neighbor cell and the SSB from the serving cell have the same SCS, it may be the case that a UE is able to measure the SSB from both the serving cell and the neighbor cell without any restriction, at least according to some embodiments. If the SSB from the neighbor cell and the SSB from the serving cell have different SCS, there may be several possible options, e.g., similar to those described previously herein with respect to a scenario in which the SSB from a neighbor cell configured for L1-RSRP measurement is in the same OFDM symbol as SSB from the serving cell for RLM, BFD, CBD, or L1-RSRP measurement. For example, as one possibility, if a gap is provided for neighbor cell SSB based L1 RSRP measurement, the UE may be expected to measure the neighbor cell SSB the measurement gap. As another option, the UE may be expected or required to measure only one of but not both SSB, with a longer measurement period expected. As a further option, a new UE capability may be introduced to indicate support for simultaneous measurement on SSE with different SCS, e.g., such that a UE with such capability may be able to measure the SSB from both the serving cell and the neighbor cell without any restriction, at least according to some embodiments. As a still further option, it may be the case that such a configuration with SSB from a neighbor cell and SSB from the serving cell with different SCS is discouraged and no UE measurement requirements are defined for such a scenario.

For FR2, when the SSB from a neighbor cell configured as CMR for L1-SINR, measurement on one CC is in the same OFDM symbol as CSI-RS from the serving cell for RLM, BFD, CBD, or L1-RSRP measurement on the same CC or different CCs in the same band, it may be the case that the UE is expected or required to measure one of but not both of the SSB for L1-SINR measurement and CSI-RS. A longer measurement period for SSB based L1-SINR measurement may be expected, and no requirements may be defined, at least in some instances. For a UE that is capable of IBM on a FR2 band pair, it may be the case that there is no measurement restriction configured when the network configures mixed numerology between SSB from a neighbor cell for L1-SINR measurement on one FR2 band and CSI-RS from the serving cell for RLM, BFD, CBD, L1-RSRP, or L1-SINR measurement on the other FR2 band.

For FR1, when the SSB from a serving cell configured for RLM, BFD, CBD, L1-RSRP, or L1-SINR measurement is within the active BWP and has the same SCS as a CSI-RS from a neighbor cell configured for L1-SINR measurement in the same OFDM symbol, it may be the case that a is able to perform the CSI-RS measurement without an restriction, at least according to some embodiments. If the SSB from the serving cell and the CSI-RS from the neighbor cell have different SCS in such a scenario, if the UE supports simultaneousRxDataSSB-DiffNumerology, it may be the case that the UE is able to perform the CSI-RS measurement without any restriction. If the UE does not support simultaneousRx-DataSSB-DiffNumerology, it may be the case that the UE is required or expected to measure one of but not both of the CSI-RS for L1-SINR measurement and the SSB. A longer measurement period for CSI-RS based L1-SINR measurement may be expected, and no requirements may be defined, at least in some instances.

For FR1, when the CSI-RS from a neighbor cell configured for L1-SINR measurement is in the same OFDM symbol as another CSI-RS from the serving cell for RLM, BFD, CBD, or L1-RSRP measurement, if the two CSI-RS have the same SCS, it may be the case that a UE is able to perform both CSI-RS measurements without any restriction, at least according to some embodiments. If the CSI-RS from the neighbor cell and the CSI-RS from the serving cell have different SCS, there may be several possible options, e.g., similar to those described previously herein with respect to a scenario in which the CSI-RS from a neighbor cell configured for L1-RSRP measurement is in the same OFDM symbol as CSI-RS from the serving cell for RLM, BFD, CBD, or L1-RSRP measurement. For example, as one possibility, if a gap is provided for neighbor cell CSI-RS based L1-SINR measurement, the UE may be expected to measure the neighbor cell CSI-RS in the measurement gap. As another option, the UE may be expected or required to measure only one of but not both CSI-RS, with a longer measurement period expected. As a further option, a new UE capability may be introduced to indicate support for simultaneous measurement on CSI-RS with different SCS, e.g., such that a UE with such capability may be able to measure the CSI-RS from both the serving cell and the neighbor cell without any restriction, at least according to some embodiments. As a still further option, it may be the case that such a configuration with CSI-RS from a neighbor cell and CSI-RS from the serving cell with different SCS is discouraged and no UE measurement requirements are defined for such a scenario.

For FR2, When the CSI-RS from a neighbor cell for L1-SINR measurement on one CC is in the same. OFDM symbol as SSB from the serving cell for RLM, BFD, L1-RSRP, or L1-SINR measurement on the same CC or different CCs in the same band, or in the same symbol as SSB from the serving cell for CBD measurement on the same CC or different CCs in the same band when beam failure is detected, it may be the case that the UE is expected or required to measure one of but not both of the CSI-RS for L1-SINR measurement and SSB. A longer measurement period for CSI-RS based L1-SINR measurement may be expected, and no requirements may be defined, at least in some instances. When the CSI-RS from a neighbor cell for L1-SINR measurement on one CC is in the same OFDM symbol as another CSI-RS from a serving cell for RLM, BFD, CBD, L1-RSRP, or L1-SINR measurement on the same CC or different CCs in the same band, at least in several scenarios, it may be the case that the UE is required or expected to measure one of but not both CSI-RS for L1-SINR measurement and the other CSI-RS. A longer measurement period for CSI-RS based L1-SINR measurement may be expected in such scenarios, and no requirements may be defined, at least in some instances. Such scenarios may include if the CSI-RS from the neighbor cell for L1-SINR measurement or the other CSI-RS from the serving cell is in a resource set configured with repetition ON, if the CSI-RS from the serving cell is configured in q1 and beam failure is detected, or if the two CSI-RS resources are not QCL-ed with respect to QCL-TypeD, or the QCL information is not known to the UE. Other exceptional scenarios may additionally or alternatively be specified, if desired. If no configured exceptional scenarios are occurring, the UE may be required or expected to be able to measure the CSI-RS from the neighbor cell for L1-SINR measurement without any restriction, at least according to some embodiments.

In some instances, it may be useful to provide new radio resource management (RRM) UE capabilities to support monitoring of multiple layers using gaps, including for L1 measurements on neighbor cells. For example, for standalone (SA) NR deployments, for RRM requirements, the parameter $N_{freq, SA}$ may be used to scale the measurement delay if a UE is configured with measurement on multiple frequency layers. With L1 measurement on neighbor cells being supported, it may be the case that such measurements should be taken into account for $N_{freq, SA}$. For example, 3GPP TS 38.133 for SA could be updated in section 9.1.3.1a as follows, as one possibility.

9.1.3.1a SA: Monitoring of Multiple Layers Using Gaps
The requirements in this clause are applicable for UE configured with SA NR operation mode.
When monitoring of multiple inter-RAT E-UTRAN carriers, inter-frequency NR carriers (with or without CCA) and inter-RAT UTRA FDD carriers using gaps (or without using gaps provided the UE supports such capability) is configured by PCell, the UE shall be capable of performing one measurement of the configured measurement type (SS-RSRP, SS-RSRQ, SS-SINR, CSI-RSRP, CSI-RSRQ, CSI-SINR, E-UTRAN RSRP, E-UTRAN RSRQ, E-UTRAN RS-SINR measurements, UTRAN FDD CPICH measurement, L1-RSRP, L1-SINR, etc.) of detected cells on all the layers.
For UE configured with the NR SA operation, the effective total number of frequencies, excluding the frequencies of the PCell, PSCell and Scells being monitored, is $N_{freq, SA}$, which is defined as:

$$N_{freq,SA}=N_{freq,SA,NR}+N_{freq,SA,E-UTRA}+N_{freq,SA,UTRA},$$

where
$N_{freq, SA, E-UTRA}$ is the number of E-UTRA inter-RAT carriers being monitored (FDD and TDD) as configured by PCell or via LPP [22],
$N_{freq, SA UTRA}$ is the number of UTRA FDD inter-RAT carriers being monitored as configured by PCell,
$N_{freq, SA, NR}$ is the number of NR inter-frequency carriers being monitored as configured by PCell.

Note that similar updates (e.g., to consider L1-RSRP, L1-SINR for multiple layer RRM monitoring) may also or alternatively be applied for dual connectivity configurations (e.g., E-UTRAN-NR dual connectivity (EN-DC), NR-E-UTRAN dual connectivity (NE-DC), NR-NR dual connectivity (NR-DC)) and/or other configurations, for example in other portions of 3GPP TS 38:133 section 9.1.3.

In some embodiments, it may be useful to provide 3GPP specification guidance on maximum allowed layers for multiple monitoring including for L1 measurement on neighbor cells. For example, 3GPP TS 38:133 section 9.1.3.2a may be updated as follows, as one possibility.

9.1.3.2a SA: Maximum Allowed Layers for Multiple Monitoring
If a UE is configured with SA NR operation mode, the UE shall be capable of monitoring at least:
Depending on UE capability, 7 NR SSB inter-frequency carriers configured by PCell, and
Depending on UE capability, 8 NR inter-frequency carriers including SSB and CSI-RS in total configured by PCell, and
Depending on UE capability, X NR inter-frequency carriers including L1-RSRP or L1-SINR measurement configured by PCell, and
Depending on UE capability, 7 E-UTRA TDD inter-RAT carriers configured by PCell, and
Depending on UE capability, 7 E-UTRA FDD inter-RAT carriers configured by PCell, and
Depending on UE capability, 3 UTRA FDD inter-RAT carriers configured by PCell, and
Depending on UE capability, 1 E-UTRA FDD inter-RAT carrier for RSTD measurements configured via LBB [22], and Depending on UE capability, 1 E-UTRA TDD inter-RAT carrier for RSTD measurements configured via LBB [22], In addition to the requirements defined above, the UE shall be capable of monitoring a total of at least [13] effective carrier frequency layers comprising of any above defined combination of NR, E-UTRA FDD, E-UTRA TDD and UTRA FDD layers.

The number of SSB frequency layers equals to the total number of MOs with
ssb-ConfigMobility configured, or
ssb-ConfigMobility not configured but csi-rs-ResourceConfigMobility configured with associated-SSB, or
L1-RSRP or L1-SINR on neighbor cell(s).

Note that the value of X may be any of various possible values, such as 7, 9, etc. Note also that similar updates (e.g., to consider L1-RSRP, L1-SINR for maximum allowed layers for multiple monitoring) may also or alternatively be applied for dual connectivity configurations and/or other configurations, for example in other portions of 3GPP TS 38.133 section 9.1.3.

In some embodiments, it may be useful to provide 3GPP specification guidance on RRM UE capability on number of cells and number of SSB that accounts for L1 measurements on neighbor cells. For example, for intra-frequency layers, 3GPP TS 38.133 section 9.2.3 may be updated as follows, as one possibility.

9.2.3 Number of Cells and Number of SSB
9.2.3.1 Requirements for FR1
For each intra-frequency layer, during each layer 1 measurement period, the UE shall be capable of performing SS-RSRP, SS-RSRQ, L1-RSRP, and SS-SINR measurements for at least:
X1 identified cells, and
X2 SSBs with different SSB index and/or PCI on the intra-frequency layer, where the number of SSBs in the serving cell (except for the SCell) is not smaller than the number of configured RLM-RS SSB resources.

9.2.3.2 Requirements for FR2
For one single intra-frequency layer in a band, during each layer 1 measurement period, the UE shall be capable of performing SS-RSRP, SS-RSRQ, L1-RSRP, L1-SINR and SS-SINR measurements for at least:
Y1 identified cells, and
Y2 SSBs with different SSB index and/or PCI,
where this single intra-frequency layer shall be:
PCC when UE is configured with SA NR operation mode with PCC in the band; or
PSCC when UE is configured with EN-DC with PSCC in the band; or
PSCC when UE is configured with NR-DC with PSCC in the band; or
One of the SCCs on which UE is configured to report SSB based measurements when neither PCC nor PSCC is in the same band, so that the selected SCC shall be an SCC where the UE is configured with SS-RSRP measurement reporting if such SCC exists, otherwise the selected SCC is determined by UE implementation.

The UE shall also be capable of performing SS-RSRP, SS-RSRQ, and SS-SINR measurements for at least 2 SSBs on serving cell for reach of the other intra-frequency layer(s) in the same band.

Note that the values of X1, X2, Y1, Y2 may be any of various possible values. In some instances, it may be the case that X1 is no less than 8, X2 is no less than 14, Y1 is no less than 6, and/or Y2 is no less than 24.

As another example, for inter-frequency layers, 3GPP TS 38.133 section 9.3.3 may be updated as follows, as one possibility.

9.1.3 Number of Cells and Number of SSB
9.3.3.1 Requirements for FR1
For each inter-frequency layer, during each layer 1 measurement period, the UE shall be capable of performing SS-RSRP, SS-RSRQ, L1-RSRP, L1-SINR and SS-SINR measurements for at least:
X2 identified cells, and
X2 SSBs with different SSB index and/or PCI on the inter-frequency layer.

9.3.3.2 Requirements for FR2
For each inter-frequency layer, during each layer 1 measurement period, the UE shall be capable of performing SS-RSRP, SS-RSRQ, L1-RSRP, L1-SINR and SS-SINR measurements for at least:
Y1 identified cells, and
Y2 SSBs with different SSB index and/or PCI on the inter-frequency layer, and
1 SSB per identified cell.

As in the previous example, the values of X1, X2, Y1, Y2 may be any of various possible values. In some instances, it may be the case that X1 is no less than 4, X2 is no less than 7, Y1 is no less than 4, and/or Y2 is no less than 10.

In the following further exemplary embodiments are provided.

One set of embodiments may include an apparatus, comprising: a processor configured to cause a wireless device to: establish a wireless link with a cellular base station that provides a serving cell; determine that a reference signal is configured for a neighbor cell measurement when communication with the serving cell is also configured; determine whether the reference signal for the neighbor cell measurement is configured with same or different subcarrier spacing as the communication with the serving cell; and select one or more of the reference signal for the neighbor cell measurement or the communication with the serving cell to receive based at least in part on whether the reference signal for the neighbor cell measurement is configured with same or different subcarrier spacing as the communication with the serving cell.

According to some embodiments, the processor is further configured to cause the wireless device to: provide wireless device capability information to the cellular base station, wherein the wireless device capability information indicates whether the wireless device supports simultaneously receiving reference signals for neighbor cell measurement and communications with the serving cell that have different subcarrier spacing, wherein selecting one or more of the reference signal for the neighbor cell measurement or the communication with the serving cell to receive is further based at least in part on whether the wireless device supports simultaneously receiving reference signals for neighbor cell measurement and communications with the serving cell that have different subcarrier spacing.

According to some embodiments, the wireless device capability information indicates whether the wireless device supports concurrent channel state information reference signals (CSI-RS) based neighbor cell measurement and serving cell physical downlink control channel (PDCCH) or physical downlink shared channel (PDSCH) reception with different subcarrier spacing.

According to some embodiments, the wireless device capability information indicates one or more different subcarrier spacing combinations for which the wireless device supports concurrent CSI-RS based neighbor cell measurement and serving cell PDCCH or PDSCH reception with different subcarrier spacing.

According to some embodiments, the wireless device capability information indicates whether the wireless device supports concurrent CSI-RS based neighbor cell measurement and serving cell PDCCH or PDSCH reception with different subcarrier spacing for one or more of 3GPP layer 1 (L1) or layer 3 (L3) neighbor cell measurement.

According to some embodiments, the wireless device capability information indicates whether the wireless device supports concurrent CSI-RS based neighbor cell measurement and serving cell PDCCH or PDSCH reception with different subcarrier spacing for one or more of intra-frequency measurement or inter-frequency measurement.

According to some embodiments, the reference signal configured for the neighbor cell measurement comprises at least one of: channel state information reference signal (CSI-RS) for layer 1 (L1) reference signal received power (RSRP) measurement: CSI-RS for L1 signal to interference plus noise ratio (SINR) measurement; CSI-RS for layer 3 (L3) measurement synchronization signal block (SSB) for L1-RSRP measurement; SSB for L1-SINR measurement; or SSB for L3 measurement.

According to some embodiments, the communication with the serving cell comprises at least one of: a physical downlink control channel (PDCCH) transmission; a physical downlink shared channel (PDSCH) transmission; a channel state information reference signal (CSI-RS); or a synchronization signal block (SSB).

Another set of embodiments may include a wireless device, comprising: an antenna; a radio operably coupled to the antenna; and a processor operably coupled to the radio; wherein the wireless device is configured to: establish a wireless link with a cellular base station that provides a serving cell; determine that a reference signal is configured for a neighbor cell measurement when communication with the serving cell is also configured; determine whether the reference signal for the neighbor cell measurement is configured with same or different subcarrier spacing as the communication with the serving cell; and select one or more of the reference signal for the neighbor cell measurement or the communication with the serving cell to receive based at least in part on whether the reference signal for the neighbor cell measurement is configured with same or different subcarrier spacing as the communication with the serving cell.

According to some embodiments, the reference signal for the neighbor cell measurement and the communication with the serving cell are in 3GPP frequency range 1 (FR1), wherein the wireless device is further configured to: select both the reference signal for the neighbor cell measurement and the communication with the serving cell to receive if the reference signal for the neighbor cell measurement is configured with same subcarrier spacing as the communication with the serving cell.

According to some embodiments, the reference signal for the neighbor cell measurement and the communication with the serving cell are in 3GPP frequency range 1 (FR1), wherein the wireless device is further configured to: select both the reference signal for the neighbor cell measurement and the communication with the serving cell to receive if the reference signal for the neighbor cell measurement is configured with different subcarrier spacing as the communication with the serving cell and the wireless device supports simultaneously receiving reference signals for neighbor cell measurement and communications with the serving cell that have different subcarrier spacing.

According to some embodiments, the reference signal for the neighbor cell measurement and the communication with the serving cell are in 3GPP frequency range 1 (FR1), wherein the wireless device is further configured to: select only one of the reference signal for the neighbor cell measurement or the communication with the serving cell to receive if the reference signal for the neighbor cell measurement is configured with different subcarrier spacing as the communication with the serving cell and the wireless device does not support simultaneously receiving reference signals for neighbor cell measurement and communications with the serving cell that have different subcarrier spacing.

According to some embodiments, the wireless device is further configured to: select only the reference signal for the neighbor cell measurement to receive during one or more orthogonal frequency division multiplexing (OFDM) symbols; receive the reference signal for the neighbor cell measurement during the one or more OFDM symbols; drop communication with the serving cell during the one or more OFDM symbols; determine whether a received timing difference between the reference signal for the neighbor cell measurement and the communication with the serving cell is greater than a threshold; and drop communication with the serving cell for at least one OFDM symbol before the one or more OFDM symbols and for at least one OFDM symbol after the one or more OFDM symbols if the received timing difference between the reference signal for the neighbor cell measurement and the communication with the serving cell is greater than the threshold.

According to some embodiments, the reference signal for the neighbor cell measurement and the communication with the serving cell are in 3GPP frequency range 2 (FR2), wherein the wireless device is further configured to: determine whether the reference signal for the neighbor cell measurement is configured with same or different beam configuration as the communication with the serving cell, wherein selecting one or more of the reference signal for the neighbor cell measurement or the communication with the serving cell to receive is further based at least in part on whether the reference signal for the neighbor cell measurement is configured with same or different beam configuration as the communication with the serving cell.

According to some embodiments, the wireless device is further configured to: determine whether the reference signal for the neighbor cell measurement is configured in a same or different band us the communication with the serving cell, wherein selecting one or more of the reference signal for the neighbor cell measurement or the communication with the serving cell to receive is further based at least in part on whether the reference signal for the neighbor cell measurement is configured in the same or different band as the communication with the serving cell.

Yet another set of embodiments may include a method, comprising: by a wireless device: establishing a wireless link with a cellular base station that provides a serving cell; determining that a reference signal is configured for a neighbor cell measurement when communication with the serving cell is also configured; determining whether the reference signal for the neighbor cell measurement is configured with same or different subcarrier spacing as the communication with the serving cell; and selecting one or more of the reference signal for the neighbor cell measurement or the communication with the serving cell to receive based at least in part on whether the reference signal for the neighbor cell measurement is configured with same or different subcarrier spacing as the communication with the serving cell.

According to some embodiments, the method further comprises: providing wireless device capability information to the cellular base station, wherein the wireless device capability information indicates one or more layer 1 (L1) neighbor cell measurement support capabilities of the wireless device.

According to some embodiments, the method further comprises: determining a communication type of the communication with the serving cell, wherein selecting one or more of the reference signal for the neighbor cell measurement or the communication with the serving cell to receive is further based at least in part on the communication type of the communication with the serving cell.

According to some embodiments, the method further comprises: providing wireless device capability information to the cellular base station, wherein the wireless device capability information indicates one or more concurrent neighbor cell and serving cell reception with different numerology support capabilities of the wireless device.

According to some embodiments, the one or more concurrent neighbor cell and serving cell reception with different numerology support capabilities include one or more of: support for concurrent channel state information reference signals (CSI-RS) based neighbor cell measurement and serving cell physical downlink control channel (PDCCH) or physical downlink shared channel (PDSCH) reception with different subcarrier spacing; support for concurrent synchronization signal block (SSB) based neighbor cell measurement and SSB based serving cell measurement with different subcarrier spacing; or support for concurrent CSI-RS based neighbor cell measurement and CSI-RS based serving cell measurement with different subcarrier spacing.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
 a processor configured to cause a wireless device to perform operations comprising:
  communicating via a wireless link with a cellular base station that provides a serving cell;
  determining scheduling availability of a wireless device due to neighbor cell layer 1 (L1) measurement, wherein a synchronization signal block (SSB) from a neighbor cell is configured for L1 measurement, comprising:
   when the SSB from the neighbor cell configured for L1 measurement have the same subcarrier spacing (SCS) as physical downlink control channel/physical downlink shared channel (PDCCH/PDSCH) in an active bandwidth part of the serving cell, determining that there are no scheduling restrictions due to the neighbor cell L1 measurement; and when the SSB from the neighbor cell configured for L1 measurement have different SCS as the PDCCH/PDSCH in the active bandwidth part of the serving cell:
  if the wireless device supports simultaneousRx-DataSSB-DiffNumerology, determining there are no scheduling restrictions due to the neighbor cell L1 measurement; and
  if the wireless device does not support simultaneousRxDataSSB-DiffNumerology:
    in a first case when a received timing difference, RTD, between the SSB from the neighbour cell configured for L1 measurement and the serving cell is less than or equal to a cyclic prefix, CP, length, determining transmission of a first set of one or more uplink transmissions or reception of a first set of one or more downlink receptions on a first set of symbols corresponding to SSB indexes configured for L1 measurement of the neighbour cell is not expected; or
    in a second case when the RTD between the SSB from the neighbour cell configured for L1 measurement and the serving cell exceeds the CP length, determining transmission of the first set of one or more uplink transmissions or reception of the first set of one or more downlink receptions on an additional symbol before and an additional symbol after a symbol corresponding to SSB indexes from the neighbour cell configured for L1 measurement is not expected.

2. The apparatus of claim 1, the operations further comprising:
  provide wireless device capability information to the cellular base station, wherein the wireless device capability information indicates one or more L1 neighbor cell measurement support capabilities of the wireless device.

3. The apparatus of claim 1, the operations further comprising:
  determining a communication type of the communication with the serving cell.

4. The apparatus of claim 1, the operations further comprising:
  providing wireless device capability information to the cellular base station, wherein the wireless device capability information indicates one or more concurrent neighbor cell and serving cell reception with different numerology support capabilities of the wireless device.

5. The apparatus of claim 4,
wherein the one or more concurrent neighbor cell and serving cell reception with different numerology support capabilities include one or more of:
  support for concurrent channel state information reference signals (CSI-RS) based neighbor cell measurement and serving cell PDCCH or PDSCH reception with different subcarrier spacing;
  support for concurrent SSB based neighbor cell measurement and SSB based serving cell measurement with different subcarrier spacing; or
  support for concurrent CSI-RS based neighbor cell measurement and CSI-RS based serving cell measurement with different subcarrier spacing.

6. The apparatus of claim 1, the operations further comprising:
  providing wireless device capability information to the cellular base station, wherein the wireless device capability information indicates whether the wireless device supports simultaneously receiving reference signals for neighbor cell measurement and communications with the serving cell that have different SCS, wherein selecting one or more of the reference signal for the neighbor cell measurement or the communication with the serving cell to receive is further based at least in part on whether the wireless device supports simultaneously receiving reference signals for neighbor cell measurement and communications with the serving cell that have different SCS.

7. The apparatus of claim 6,
wherein the wireless device capability information indicates whether the wireless device supports concurrent channel state information reference signals (CSI-RS) based neighbor cell measurement and serving cell PDCCH or PDSCH reception with different SCS.

8. The apparatus of claim 7,
wherein the wireless device capability information indicates one or more different SCS combinations for which the wireless device supports concurrent CSI-RS based neighbor cell measurement and serving cell PDCCH or PDSCH reception with different subcarrier spacing.

9. The apparatus of claim 7,
wherein the wireless device capability information indicates whether the wireless device supports concurrent CSI-RS based neighbor cell measurement and serving cell PDCCH or PDSCH reception with different SCS for one or more of 3GPP L1 or layer 3 (L3) neighbor cell measurement.

10. The apparatus of claim 7,
wherein the wireless device capability information indicates whether the wireless device supports concurrent CSI-RS based neighbor cell measurement and serving cell PDCCH or PDSCH reception with different subcarrier spacing for one or more of intra-frequency measurement or inter-frequency measurement.

11. The apparatus of claim 1, wherein the one or more downlink receptions comprise one or more of: PDCCH/PDSCH/channel state information reference signal (CSI-RS) for tracking/CSI-RS for channel quality information (CQI).

12. The apparatus of claim 1, wherein the one or more uplink transmissions comprise one or more of: physical uplink control channel/physical uplink shared channel/sounding reference signal (PUCCH/PUSCH/SRS).

13. A wireless device, comprising:
  a radio; and
  a processor operably coupled to the radio, wherein the radio and the processor are configured to perform operations comprising:
    communicating via a wireless link with a cellular base station that provides a serving cell;
    determining scheduling availability of a wireless device due to neighbor cell layer 1 (L1) measurement, wherein a synchronization signal block (SSB) from a neighbor cell is configured for L1 measurement, comprising:
      when the SSB from the neighbor cell configured for L1 measurement have the same subcarrier spacing (SCS) as physical downlink control channel/physical downlink shared channel (PDCCH/PDSCH) in an active bandwidth part of the serving cell, determining that there are no scheduling restrictions due to the neighbor cell L1 measurement; and when the SSB from the neighbor cell configured for L1 measurement have different SCS as the PDCCH/PDSCH in the active bandwidth part of the serving cell:
  if the wireless device supports simultaneousRxDataSSB-DiffNumerology, determining there are no scheduling restrictions due to the neighbor cell L1 measurement; and
  if the wireless device does not support simultaneousRxDataSSB-DiffNumerology:
    in a first case when a received timing difference, RTD, between the SSB from the neighbour cell configured for L1 measurement and the serving cell is less than or equal to a cyclic prefix, CP, length, determining transmission of a first set of one or more uplink transmissions or reception of a first set of one or more downlink receptions on a first set of symbols corresponding to SSB indexes configured for L1 measurement of the neighbour cell is not expected; or
    in a second case when the RTD between the SSB from the neighbour cell configured for L1 measurement and the serving cell exceeds the CP length, determining transmission of the first set of one or more uplink transmissions or reception of the first set of one or more downlink receptions on an additional symbol before and an additional symbol after a symbol corresponding to SSB indexes from the neighbour cell configured for L1 measurement is not expected.

14. The wireless device of claim 13, the operations further comprising:
provide wireless device capability information to the cellular base station, wherein the wireless device capability information indicates one or more L1 neighbor cell measurement support capabilities of the wireless device.

15. The wireless device of claim 13, the operations further comprising:
determining a communication type of the communication with the serving cell.

16. The wireless device of claim 13, the operations further comprising:
providing wireless device capability information to the cellular base station, wherein the wireless device capability information indicates one or more concurrent neighbor cell and serving cell reception with different numerology support capabilities of the wireless device.

17. A method, comprising:
communicating via a wireless link with a cellular base station that provides a serving cell;
determining scheduling availability of a wireless device due to neighbor cell layer 1 (L1) measurement, wherein a synchronization signal block (SSB) from a neighbor cell is configured for L1 measurement, comprising:
  when the SSB from the neighbor cell configured for L1 measurement have the same subcarrier spacing (SCS) as physical downlink control channel/physical downlink shared channel (PDCCH/PDSCH) in an active bandwidth part of the serving cell, determining that there are no scheduling restrictions due to the neighbor cell L1 measurement; and
  when the SSB from the neighbor cell configured for L1 measurement have different SCS as the PDCCH/PDSCH in the active bandwidth part of the serving cell:
    if the wireless device supports simultaneousRxDataSSB-DiffNumerology, determining there are no scheduling restrictions due to the neighbor cell L1 measurement; and
    if the wireless device does not support simultaneousRxDataSSB-DiffNumerology:
      in a first case when a received timing difference, RTD, between the SSB from the neighbour cell configured for L1 measurement and the serving cell is less than or equal to a cyclic prefix, CP, length, determining transmission of a first set of one or more uplink transmissions or reception of a first set of one or more downlink receptions on a first set of symbols corresponding to SSB indexes configured for L1 measurement of the neighbour cell is not expected; or
      in a second case when the RTD between the SSB from the neighbour cell configured for L1 measurement and the serving cell exceeds the CP length, determining transmission of the first set of one or more uplink transmissions or reception of the first set of one or more downlink receptions on an additional symbol before and an additional symbol after a symbol corresponding to SSB indexes from the neighbour cell configured for L1 measurement is not expected.

18. The method of claim 17, further comprising:
provide wireless device capability information to the cellular base station, wherein the wireless device capability information indicates one or more L1 neighbor cell measurement support capabilities of the wireless device.

19. The method of claim 17, further comprising:
determining a communication type of the communication with the serving cell.

20. The method of claim 17, further comprising:
providing wireless device capability information to the cellular base station, wherein the wireless device capability information indicates one or more concurrent neighbor cell and serving cell reception with different numerology support capabilities of the wireless device.

* * * * *